US010048461B2

United States Patent
Liu et al.

(10) Patent No.: US 10,048,461 B2
(45) Date of Patent: Aug. 14, 2018

(54) METHOD AND APPARATUS FOR PERFORMING TEMPERATURE COMPENSATION FOR CAMERA

(71) Applicant: Huawei Technologies Co., Ltd., Shenzhen (CN)

(72) Inventors: Yuanqing Liu, Suzhou (CN); Guangyao Zhao, Shenzhen (CN); Jing Wang, Shenzhen (CN); Kai Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 15/290,785

(22) Filed: Oct. 11, 2016

(65) Prior Publication Data
US 2017/0031128 A1 Feb. 2, 2017

Related U.S. Application Data

(63) Continuation of application No. PCT/CN2015/076095, filed on Apr. 8, 2015.

(30) Foreign Application Priority Data

Apr. 11, 2014 (CN) .......................... 2014 1 0145736

(51) Int. Cl.
*G02B 7/02* (2006.01)
*G02B 7/04* (2006.01)
(Continued)

(52) U.S. Cl.
CPC .............. *G02B 7/028* (2013.01); *G02B 7/04* (2013.01); *G02B 7/102* (2013.01); *G02B 15/15* (2013.01);
(Continued)

(58) Field of Classification Search
USPC ........................................................ 359/820
See application file for complete search history.

(56) References Cited

U.S. PATENT DOCUMENTS

| 5,412,448 A | * | 5/1995 | Kunishige | ................ | G01K 7/01 |
| | | | | | 374/E7.035 |
| 5,600,496 A | * | 2/1997 | Mori | ...................... | G02B 15/14 |
| | | | | | 359/820 |

(Continued)

FOREIGN PATENT DOCUMENTS

| CN | 101197938 A | 6/2008 |
| CN | 103389559 A | 11/2013 |
| CN | 104092933 A | 10/2014 |

OTHER PUBLICATIONS

Machine Translation and Abstract of Chinese Publication No. CN103389559, Nov. 13, 2013, 4 pages.
(Continued)

*Primary Examiner* — Darryl J Collins
(74) *Attorney, Agent, or Firm* — Conley Rose, P.C.

(57) ABSTRACT

A method and an apparatus for performing temperature compensation for a camera. The method includes: obtaining temperature information of a camera lens of the camera using a temperature sensor; obtaining a lens target movement position according to position information of a motor that controls a lens of the camera to move and the temperature information; and controlling, according to the obtained lens target movement position, a corresponding lens to move to a target movement position. According to the method and apparatus provided in this application, an imaging quality change, which is caused by a temperature change, of a camera can be compensated for using a simple and convenient method, and practicability is high.

19 Claims, 7 Drawing Sheets

(51) Int. Cl.
*G02B 15/15* (2006.01)
*H04N 5/232* (2006.01)
*G02B 7/10* (2006.01)

(52) U.S. Cl.
CPC ..... *H04N 5/23212* (2013.01); *H04N 5/23216* (2013.01); *H04N 5/23296* (2013.01)

(56) References Cited

U.S. PATENT DOCUMENTS

| | | | |
|---|---|---|---|
| 7,382,556 | B2 | 6/2008 | Lee |
| 2005/0099523 | A1 | 5/2005 | Konishi et al. |
| 2009/0168199 | A1* | 7/2009 | Ishikawa ................ G02B 7/028 359/696 |
| 2014/0093228 | A1* | 4/2014 | Gredegard ............... G02B 7/09 396/97 |
| 2014/0168383 | A1* | 6/2014 | Murakami ............... G02B 7/36 348/47 |

OTHER PUBLICATIONS

Machine Translation and Abstract of Chinese Publication No. CN104092933, Oct. 8, 2014, 3 pages.
Hong-Hai, S., et al., "Application of active-athermal compensation to airborne IR optical systems," Optics and Precision Engineering, vol. 18, No. 3, Mar. 2010, 9 pages.
English Translation of Hong-Hai, S., et al., "Application of active-athermal compensation to airborne IR optical systems," Optics and Precision Engineering, vol. 18, No. 3, Mar. 2010, 12 pages.
Foreign Communication From a Counterpart Application, PCT Application No. PCT/CN2015/076095, English Translation of International Search Report dated Jul. 17, 2015, 2 pages.
Foreign Communication From a Counterpart Application, PCT Application No. PCT/CN2015/076095, English Translation of Written Opinion dated Jul. 17, 2015, 9 pages.

* cited by examiner

METHOD AND APPARATUS FOR PERFORMING TEMPERATURE COMPENSATION FOR CAMERA

CROSS-REFERENCE TO RELATED APPLICATIONS

This application is a continuation of International Application No. PCT/CN2015/076095, filed on Apr. 8, 2015, which claims priority to Chinese Patent Application No. 201410145736.8, filed on Apr. 11, 2014. The disclosures of the aforementioned applications are hereby incorporated by reference in their entireties.

TECHNICAL FIELD

The present disclosure relates to the field of image processing technologies, and in particular, to a method and an apparatus for performing temperature compensation for a camera.

BACKGROUND

With the development of digital cameras, more cameras are applied to the video surveillance field, the video conference field, and the like. Because cameras are installed in different environments, working temperatures are different. In addition, a working time of a camera also causes a change in an internal temperature of the camera. The change of the temperature of the camera affects imaging quality of an optical system. Generally, the impact is mainly reflected in three aspects: (1) the temperature change causes a change in a medium refractive index; (2) the temperature change causes a change in a curvature radius and a central thickness of a refracting surface of an optical element; and (3) the temperature change causes a change in an interval between optical elements in the optical system. If a change caused by a temperature is not appropriately compensated for, imaging quality will be greatly affected. Therefore, how to perform temperature compensation for a camera becomes a problem urgently needing to be resolved.

A method already exists in the prior art: when a temperature changes, a position to which a focusing lens is moved according to the temperature change is calculated, and it is determined whether compensation is performed for the position to which the focusing lens is moved. In the method, the position to which the focusing lens is moved is calculated based on a ratio of a distance between a position of the focusing lens in a previous state and a Charge-coupled Device (CCD), which may also be referred to as a CCD image sensor, to a distance between a reference position and the CCD and information related to movement displacement relative to the reference position.

In a process of implementing the present disclosure, the inventor finds that in the prior art, when temperature compensation is performed for a focusing lens, calculation needs to be performed by depending on an absolute distance between the focusing lens and a CCD. However, because the focusing lens and the CCD are packaged in a lens cone, it is hard to measure the distance and an accuracy requirement is very high; therefore, practicability of the method is not high.

SUMMARY

To resolve the foregoing technical problem, the present disclosure discloses a method and an apparatus for performing temperature compensation for a camera, so that an imaging quality change, which is caused by a temperature change, of a camera can be compensated for using a simple and convenient method, and practicability is high.

Technical solutions are as follows:

According to a first aspect of embodiments of the present disclosure, a method for performing temperature compensation for a camera is disclosed, where the method includes: obtaining temperature information of a camera lens of the camera using a temperature sensor; obtaining a lens target movement position according to position information of a motor that controls a lens of the camera to move and the temperature information; and controlling, according to the obtained lens target movement position, a corresponding lens to move to a target movement position.

With reference to the first aspect of the embodiments of the present disclosure, the embodiments of the present disclosure further have a first possibility, where the obtaining a lens target movement position according to position information of a motor that controls a lens of the camera to move and the temperature information includes: obtaining current lens position information according to the position information of the motor that controls the lens of the camera to move; obtaining a lens displacement compensation value according to the position information of the motor that controls the lens of the camera to move and the temperature information; and obtaining the lens target movement position according to the current lens position information and the lens displacement compensation value.

With reference to the first aspect of the embodiments of the present disclosure and the first possibility of the embodiments of the present disclosure, the embodiments of the present disclosure further have a second possibility, where the obtaining a lens displacement compensation value according to the position information of the motor that controls the lens of the camera to move and the temperature information includes obtaining the lens displacement compensation value according to the temperature information and the current lens position information that is obtained according to the position information of the motor that controls the lens to move.

With reference to the first aspect of the embodiments of the present disclosure and the second possibility of the embodiments of the present disclosure, the embodiments of the present disclosure further have a third possibility, where the obtaining the lens displacement compensation value according to the temperature information and the current lens position information that is obtained according to the position information of the motor that controls the lens to move includes obtaining the lens displacement compensation value according to the temperature information, the current lens position information, and a prestored correspondence among temperature information, lens position information, and a lens displacement compensation value.

With reference to the first aspect of the embodiments of the present disclosure and the first possibility of the embodiments of the present disclosure, the embodiments of the present disclosure further have a fourth possibility, where the obtaining a lens displacement compensation value according to the position information of the motor that controls the lens of the camera to move and the temperature information includes: obtaining current zoom multiple information according to position information of a motor that controls a zoom lens to move; and obtaining a zoom lens displacement compensation value according to the temperature information and the current zoom multiple information, and/or obtaining current object distance information according to position information of a motor that controls a focusing lens to move and the current zoom multiple information, and obtaining a focusing lens displacement compensation value according to the temperature information, the current zoom multiple information, and the current object distance information.

With reference to the first aspect of the embodiments of the present disclosure and the fourth possibility of the embodiments of the present disclosure, the embodiments of the present disclosure further have a fifth possibility, where the obtaining a zoom lens displacement compensation value according to the temperature information and the current zoom multiple information includes obtaining the zoom lens displacement compensation value according to the temperature information, the current zoom multiple information, and a prestored correspondence among temperature information, zoom multiple information, and a zoom lens displacement compensation value.

With reference to the first aspect of the embodiments of the present disclosure and the fourth possibility of the embodiments of the present disclosure, the embodiments of the present disclosure further have a sixth possibility, where the obtaining current object distance information according to position information of a motor that controls a focusing lens to move and the current zoom multiple information, and obtaining a focusing lens displacement compensation value according to the temperature information, the current zoom multiple information, and the current object distance information includes: obtaining the current object distance information according to the position information of the motor that controls the focusing lens to move and the current zoom multiple information; and obtaining the focusing lens displacement compensation value according to the temperature information, the current zoom multiple information, the current object distance information, and a prestored correspondence among temperature information, zoom multiple information, object distance information, and a focusing lens displacement compensation value.

According to a second aspect of the embodiments of the present disclosure, an apparatus for performing temperature compensation for a camera is disclosed, where the apparatus includes: a temperature collection unit configured to obtain temperature information of a camera lens of the camera using a temperature sensor; a processing unit configured to obtain a lens target movement position according to position information of a motor that controls a lens of the camera to move and the temperature information; and a control unit configured to control, according to the obtained lens target movement position, a corresponding lens to move to a target movement position.

With reference to the second aspect of the embodiments of the present disclosure, the embodiments of the present disclosure further have a first possibility, where the processing unit includes: a current position information obtaining unit configured to obtain current lens position information according to the position information of the motor that controls the lens to move; a displacement compensation value obtaining unit configured to obtain a lens displacement compensation value according to the position information of the motor that controls the lens of the camera to move and the temperature information; and a target movement position obtaining unit configured to obtain the lens target movement position according to the current lens position information and the lens displacement compensation value.

With reference to the second aspect of the embodiments of the present disclosure and the seventh possibility of the embodiments of the present disclosure, the embodiments of the present disclosure further have an eighth possibility, where the displacement compensation value obtaining unit includes a first displacement compensation value obtaining unit configured to obtain the lens displacement compensation value according to the temperature information and the current lens position information that is obtained according to the position information of the motor that controls the lens to move.

With reference to the second aspect of the embodiments of the present disclosure and the seventh possibility of the embodiments of the present disclosure, the embodiments of the present disclosure further have a ninth possibility, where the displacement compensation value obtaining unit includes: a zoom multiple information obtaining unit configured to obtain current zoom multiple information according to position information of a motor that controls a zoom lens to move; and a zoom lens displacement compensation value obtaining unit configured to obtain a zoom lens displacement compensation value according to the temperature information and the current zoom multiple information, and/or a focusing lens displacement compensation value obtaining unit configured to obtain current object distance information according to position information of a motor that controls a focusing lens to move and the current zoom multiple information, and obtain a focusing lens displacement compensation value according to the temperature information, the current zoom multiple information, and the current object distance information.

According to a third aspect of the embodiments of the present disclosure, a camera is disclosed, where the camera includes a camera lens, a focusing lens, a zoom lens, a temperature sensor, a processor, and a motor driver, where the temperature sensor is configured to obtain temperature information of the camera lens of the camera; the processor is configured to obtain a lens target movement position according to position information of a motor that controls a lens of the camera to move and the temperature information; and the motor driver is configured to control, according to the obtained lens target movement position, a corresponding lens to move to a target movement position.

With reference to the third aspect of the embodiments of the present disclosure, the embodiments of the present disclosure further have a tenth possibility, where the processor is specifically configured to: obtain current lens position information according to the position information of the motor that controls the lens of the camera to move; obtain a lens displacement compensation value according to the position information of the motor that controls the lens of the camera to move and the temperature information; and obtain the lens target movement position according to the current lens position information and the lens displacement compensation value.

With reference to the third aspect of the embodiments of the present disclosure and the tenth possibility of the embodiments of the present disclosure, the embodiments of the present disclosure further have an eleventh possibility, where the processor is specifically configured to obtain the lens displacement compensation value according to the temperature information and the current lens position information that is obtained according to the position information of the motor that controls the lens to move.

With reference to the third aspect of the embodiments of the present disclosure and the tenth possibility of the embodiments of the present disclosure, the embodiments of the present disclosure further have a twelfth possibility, where the processor is specifically configured to: obtain current zoom multiple information according to position information of a motor that controls a zoom lens to move;

and obtain a zoom lens displacement compensation value according to the temperature information and the current zoom multiple information, and/or obtain current object distance information according to position information of a motor that controls a focusing lens to move and the current zoom multiple information, and obtain a focusing lens displacement compensation value according to the temperature information, the current zoom multiple information, and the current object distance information.

One aspect of the embodiments of the present disclosure can achieve the following beneficial effects: in the method for performing temperature compensation for a camera provided in the embodiments of the present disclosure, a lens target movement position is obtained according to position information of a motor that controls a lens of a camera to move and temperature information, and a corresponding lens is controlled to move to a corresponding position for compensation; therefore, an imaging quality change, which is caused by a temperature change, of the camera can be effectively compensated for. In the technical solutions, the lens target movement position is obtained using the position information of the motor and the temperature information that is relatively easy to obtain instead of depending on position information, which is relatively hard to obtain, of the lens relative to an image sensor; therefore, the method is easy to implement, and has high practicability.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The idea of the present disclosure is described first. In a process of implementing the present disclosure, the inventor finds that in the prior art, when temperature compensation is performed for a focusing lens, calculation needs to be performed by depending on an absolute distance between the focusing lens and a CCD. However, because the focusing lens and the CCD are packaged in a lens cone, it is hard to measure the distance and an accuracy requirement is very high; therefore, practicability of the method in the prior art is not high.

On the other hand, because in the prior art, only a method for compensating for a change, which is generated due to a temperature change, of a focusing lens relative to a CCD position is considered, but impact of a zoom lens on an imaging effect is not considered, a defect exists in principle, and it is impossible to produce a very good effect.

To resolve the foregoing technical problem, embodiments of the present disclosure provide a method and an apparatus for performing temperature compensation for a camera, so that an imaging quality change, which is caused by a temperature change, of a camera can be compensated for using a simple and convenient method, and practicability is high.

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
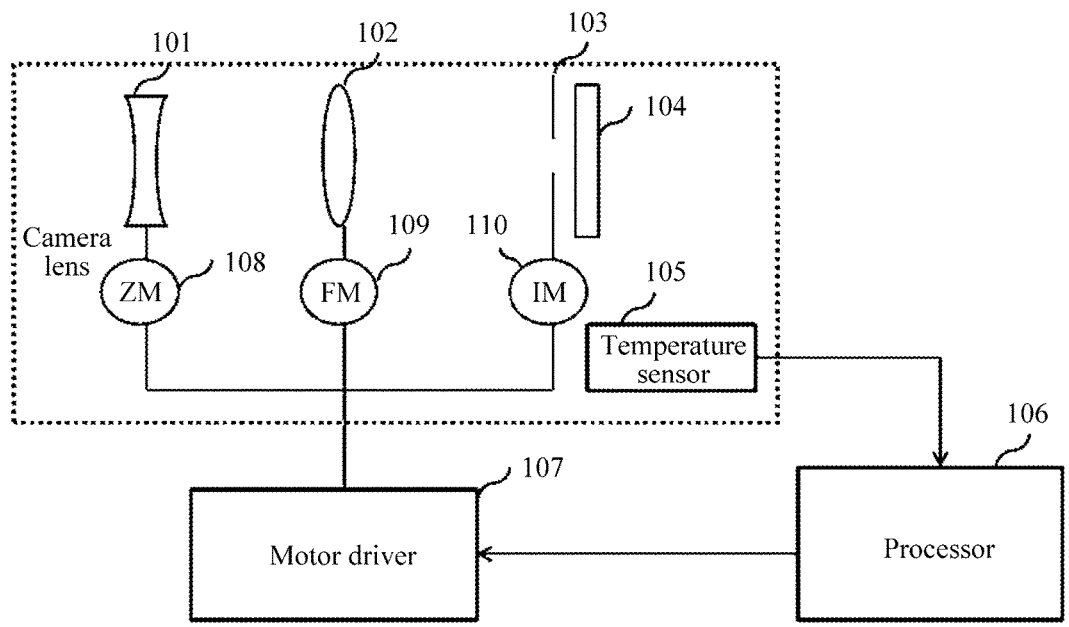
FIG. 1 is a schematic diagram of a camera according to an embodiment of the present disclosure.

FIG. 1 is a schematic diagram of a camera according to an embodiment of the present disclosure.

As shown in FIG. 1, the camera 100 provided in the present disclosure includes a zoom lens 101, a focusing lens 102, an aperture 103, an image sensor 104, a temperature sensor 105, a processor 106, a motor driver 107, a motor ZM108 controlling the zoom lens 101, a motor FM109 controlling the focusing lens 102, and a motor IM110 controlling the aperture 103. The motor driver 107 is configured to drive a motor to control a corresponding lens or the aperture to move.

The temperature sensor 105 is configured to obtain temperature information of a camera lens of the camera.

The processor 106 is configured to obtain a lens target movement position according to position information of a motor that controls a lens of the camera to move and the temperature information.

The motor driver 107 is configured to control, according to the obtained lens target movement position, a corresponding lens to move to a target movement position.

The temperature information measured by the temperature sensor may be a current temperature of the camera lens, or may be a temperature of a circuit board on the camera lens. When the temperature information measured by the temperature sensor is the temperature of the circuit board on the camera lens, a temperature of the camera lens may be obtained according to a correspondence between a temperature of the circuit board and a temperature of the camera lens. If a temperature of the camera lens in a previous state is recorded, the temperature information collected herein may also be a temperature change. A person skilled in the art may understand that any value that can reflect the temperature information of the camera lens may be collected as the temperature information, which is not limited herein.

In specific implementation, the processor is specifically configured to: obtain current lens position information according to the position information of the motor that controls the lens of the camera to move; obtain a lens displacement compensation value according to the position information of the motor that controls the lens of the camera to move and the temperature information; and obtain the lens target movement position according to the current lens position information and the lens displacement compensation value.

In specific implementation, the processor is configured to obtain current focusing lens position information according to position information of the motor that controls the focusing lens to move; and/or obtain current zoom lens position information according to position information of the motor that controls the zoom lens to move.

In a possible implementation manner, the processor is specifically configured to: obtain the lens displacement compensation value according to the temperature information and the current lens position information that is obtained according to the position information of the motor that controls the lens to move, where the obtaining the lens displacement compensation value according to the temperature information and the current lens position information may specifically include: obtaining the lens displacement compensation value according to the temperature information, the current lens position information, and a prestored correspondence among temperature information, lens position information, and a lens displacement compensation value. A person skilled in the art may understand that, in another possible implementation manner, after the current lens position information is obtained according to the position information of the motor that controls the lens to move, the lens target movement position may also be obtained directly according to the temperature information and the current lens position information.

In specific implementation, the lens may be the focusing lens and/or the zoom lens. In specific implementation, when the lens for which temperature compensation needs to be performed is the focusing lens, the obtaining, by the processor, a lens target movement position according to position information of a motor that controls a lens of the camera to move and the temperature information may include: obtaining current focusing lens position information according to the position information of the motor that controls the focusing lens to move; obtaining a focusing lens displacement compensation value according to the temperature information, the current focusing lens position information, and a prestored correspondence among temperature information, focusing lens position information, and a focusing lens displacement compensation value; and obtaining a focusing lens target movement position according to the current focusing lens position information and the lens displacement compensation value.

When the lens for which temperature compensation needs to be performed is the zoom lens, the obtaining, by the processor, a lens target movement position according to position information of a motor that controls a lens of the camera to move and the temperature information may include: obtaining current zoom lens position information according to the position information of the motor that controls the zoom lens to move; obtaining a zoom lens displacement compensation value according to the temperature information, the current zoom lens position information, and a prestored correspondence among temperature information, zoom lens position information, and a zoom lens displacement compensation value; and obtaining a zoom lens target movement position according to the current zoom lens position information and the lens displacement compensation value.

In another possible implementation manner, the processor is specifically configured to: obtain current zoom multiple information according to the position information of the motor that controls the zoom lens to move; obtain a zoom lens displacement compensation value according to the temperature information and the current zoom multiple information, and/or obtain current object distance information according to the position information of the motor that controls the focusing lens to move and the current zoom multiple information and obtain a focusing lens displacement compensation value according to the temperature information, the current zoom multiple information, and the current object distance information.

In this implementation manner, a distance between the zoom lens and an imaging plane is mapped using a zoom multiple, and a distance between the focusing lens and the imaging plane is mapped using an object distance. In specific implementation, to simplify operations, temperature compensation may be performed only for the focusing lens, or temperature compensation may be performed only for the zoom lens. Certainly, to improve imaging quality, impact of both the focusing lens and the zoom lens on an optical path may also be considered, and temperature compensation is performed for both the focusing lens and the zoom lens.

In specific implementation, the processor is specifically configured to: obtain the zoom lens displacement compensation value according to the temperature information, the current zoom multiple information, and a prestored correspondence among temperature information, zoom multiple information, and a zoom lens displacement compensation value.

In specific implementation, the processor is specifically configured to: obtain the current object distance information according to the position information of the motor that controls the focusing lens to move and the current zoom multiple information; and obtain the focusing lens displacement compensation value according to the temperature information, the current zoom multiple information, the current object distance information, and a prestored correspondence among temperature information, zoom multiple information, object distance information, and a focusing lens displacement compensation value.

Further, the motor driver includes a first motor driver and/or a second motor driver, where the first motor driver is configured to control, according to the obtained zoom lens target movement position, the zoom lens to move to a corresponding target movement position; and the second motor driver is configured to control, according to the obtained focusing lens target movement position, the focusing lens to move to a corresponding target movement position.

Certainly, a person skilled in the art may understand that a same motor driver may be used to drive the corresponding motor that controls the focusing lens and the corresponding motor that controls the zoom lens.

In this embodiment, temperature compensation can be implemented for the camera using a simple method, and imaging quality is improved. For the specific working principle of the camera, reference may be made to descriptions of Embodiment 4 to Embodiment 7, and reference may be made to schematic implementation of FIG. 4 to FIG. 9.

Embodiment 2

Figure 2:
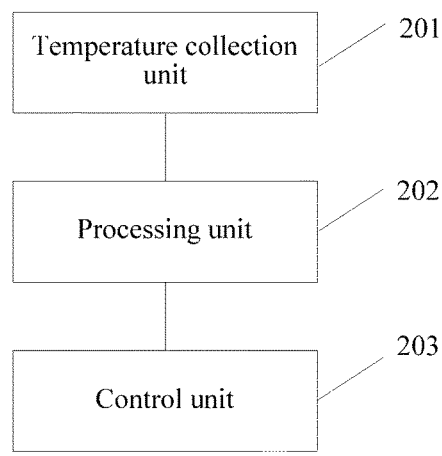
FIG. 2 is a schematic diagram of an embodiment of an apparatus for performing temperature compensation for a camera according to the embodiments of the present disclosure.

Refer to FIG. 2, which is a schematic diagram of an embodiment of an apparatus for performing temperature compensation for a camera according to the embodiments of the present disclosure.

An apparatus for performing temperature compensation for a camera is disclosed, where the apparatus includes: a temperature collection unit 201 configured to obtain temperature information of a camera lens of the camera using a temperature sensor; a processing unit 202 configured to obtain a lens target movement position according to position information of a motor that controls a lens of the camera to move and the temperature information; and a control unit 203 configured to control, according to the obtained lens target movement position, a corresponding lens to move to a target movement position.

Further, the processing unit includes: a current position information obtaining unit configured to obtain current lens position information according to the position information of the motor that controls the lens to move; a displacement compensation value obtaining unit configured to obtain a lens displacement compensation value according to the position information of the motor that controls the lens of the camera to move and the temperature information; and a target movement position obtaining unit configured to obtain the lens target movement position according to the current lens position information and the lens displacement compensation value.

Further, the displacement compensation value obtaining unit includes: a first displacement compensation value obtaining unit configured to obtain the lens displacement compensation value according to the temperature information and the current lens position information that is obtained according to the position information of the motor that controls the lens to move.

Further, the first displacement compensation value obtaining unit is specifically configured to obtain the lens displacement compensation value according to the temperature information, the current lens position information, and a prestored correspondence among temperature information, lens position information, and a lens displacement compensation value.

Further, the displacement compensation value obtaining unit includes: a zoom multiple information obtaining unit configured to obtain current zoom multiple information according to position information of a motor that controls a zoom lens to move; and a zoom lens displacement compensation value obtaining unit configured to obtain a zoom lens displacement compensation value according to the temperature information and the current zoom multiple information, and/or a focusing lens displacement compensation value obtaining unit configured to obtain current object distance information according to position information of a motor that controls a focusing lens to move and the current zoom multiple information, and obtain a focusing lens displacement compensation value according to the temperature information, the current zoom multiple information, and the current object distance information.

Further, the zoom lens displacement compensation value obtaining unit is specifically configured to obtain the zoom lens displacement compensation value according to the temperature information, the current zoom multiple information, and a prestored correspondence among temperature information, zoom multiple information, and a zoom lens displacement compensation value.

Further, the focusing lens displacement compensation value obtaining unit includes: an object distance information obtaining unit configured to obtain current object distance information according to the position information of the motor that controls the focusing lens to move and the current zoom multiple information; and a compensation value obtaining unit configured to obtain the focusing lens displacement compensation value according to the temperature information, the current zoom multiple information, the current object distance information, and a prestored correspondence among temperature information, zoom multiple information, object distance information, and a focusing lens displacement compensation value.

Further, the current position information obtaining unit includes: a focusing lens position information obtaining unit configured to obtain current focusing lens position information according to the position information of the motor that controls the focusing lens to move; and/or a zoom lens position information obtaining unit configured to obtain current zoom lens position information according to the position information of the motor that controls the zoom lens to move.

Further, the control unit includes: a first control unit configured to control, according to an obtained focusing lens target movement position, the focusing lens to move to a corresponding target movement position; and/or a second control unit configured to control, according to an obtained zoom lens target movement position, the zoom lens to move to a corresponding target movement position.

Embodiment 3

Figure 3:
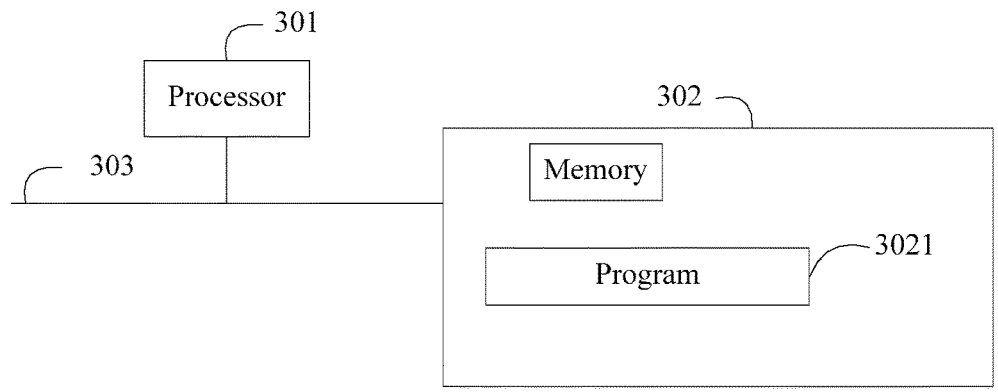
FIG. 3 is a schematic diagram of another embodiment of an apparatus for performing temperature compensation for a camera according to the embodiments of the present disclosure.

Refer to FIG. 3, which is a schematic diagram of another embodiment of an apparatus for performing temperature compensation for a camera according to the embodiments of the present disclosure.

FIG. 3 describes a structure of the apparatus for performing temperature compensation for a camera provided in another embodiment of the present disclosure, which includes at least one processor 301 (for example, a central processing unit (CPU)), a memory 302, and at least one communications bus 303 that is configured to implement connection and communication between these apparatuses. The processor 301 is configured to execute an executable module, for example, a computer program, stored in the memory 302. The memory 302 may include a high speed random access memory (RAM), or may include a non-volatile memory, for example, at least one magnetic disk storage.

In some implementation manners, the memory 302 stores a program 3021, the program 3021 may be executed by the processor 301, and the program includes: obtaining temperature information of a camera lens of the camera using a temperature sensor; obtaining a lens target movement position according to position information of a motor that controls a lens of the camera to move and the temperature information; and controlling, according to the obtained lens target movement position, a corresponding lens to move to a target movement position.

The program 3021 may further include: obtaining current lens position information according to the position information of the motor that controls the lens of the camera to move; obtaining a lens displacement compensation value according to the position information of the motor that controls the lens of the camera to move and the temperature information; and obtaining the lens target movement position according to the current lens position information and the lens displacement compensation value.

The program 3021 may further include: obtaining the lens displacement compensation value according to the temperature information and the current lens position information that is obtained according to the position information of the motor that controls the lens to move.

The program 3021 may further include: obtaining the lens displacement compensation value according to the temperature information, the current lens position information, and a prestored correspondence among temperature information, lens position information, and a lens displacement compensation value.

The program 3021 may further include: obtaining current zoom multiple information according to position information of a motor that controls a zoom lens to move; obtaining a zoom lens displacement compensation value according to the temperature information and the current zoom multiple information, and/or obtaining current object distance information according to position information of a motor that controls a focusing lens to move and the current zoom multiple information, and obtaining a focusing lens displacement compensation value according to the temperature information, the current zoom multiple information, and the current object distance information.

The program 3021 may further include: obtaining the zoom lens displacement compensation value according to the temperature information, the current zoom multiple information, and a prestored correspondence among temperature information, zoom multiple information, and a zoom lens displacement compensation value.

The program 3021 may further include: obtaining the current object distance information according to the position information of the motor that controls the focusing lens to move and the current zoom multiple information; and obtaining the focusing lens displacement compensation value according to the temperature information, the current zoom multiple information, the current object distance information, and a prestored correspondence among temperature information, zoom multiple information, object distance information, and a focusing lens displacement compensation value.

The program 3021 may further include: obtaining current focusing lens position information according to the position information of the motor that controls the focusing lens to move; and/or obtaining current zoom lens position information according to the position information of the motor that controls the zoom lens to move.

The program 3021 may further include: controlling, according to an obtained focusing lens target movement position, the focusing lens to move to a corresponding target movement position; and/or controlling, according to an obtained zoom lens target movement position, the zoom lens to move to a corresponding target movement position.

Embodiment 4

Figure 4:
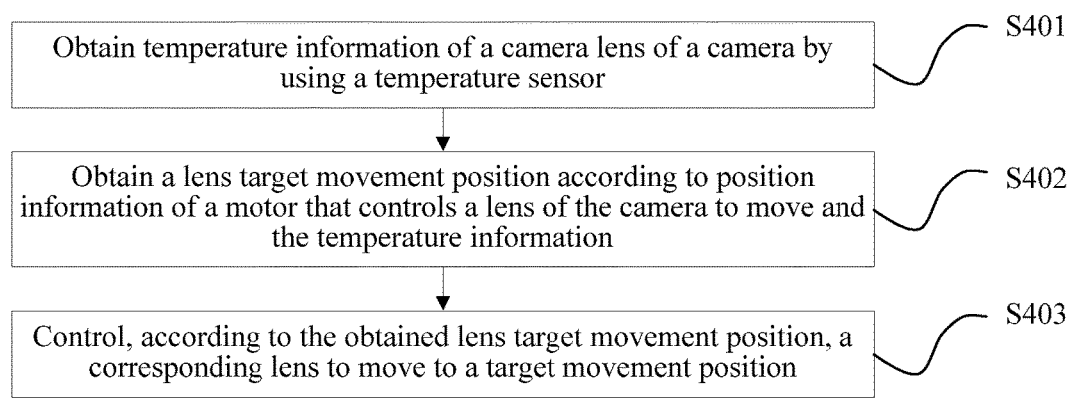
FIG. 4 is a schematic diagram of a first embodiment of a method for performing temperature compensation for a camera according to the embodiments of the present disclosure.

Refer to FIG. 4, which is a schematic diagram of a first embodiment of a method for performing temperature compensation for a camera according to the embodiments of the present disclosure. The method shown in FIG. 4 may be implemented in the camera shown in FIG. 1, and is used to perform temperature compensation for the camera shown in FIG. 1.

S401: Obtain temperature information of a camera lens of the camera using a temperature sensor.

In specific implementation, the temperature information measured by the temperature sensor may be a current temperature of the camera lens, or may be a temperature of a circuit board on the camera lens. When the temperature information measured by the temperature sensor is the temperature of the circuit board on the camera lens, a temperature of the camera lens may be obtained according to a correspondence between a temperature of the circuit board and a temperature of the camera lens. If a temperature of the camera lens in a previous state is recorded, the temperature information collected herein may also be a temperature change. A person skilled in the art may understand that any value that can reflect the temperature information of the camera lens may be collected as the temperature information, which is not limited herein.

S402: Obtain a lens target movement position according to position information of a motor that controls a lens of the camera to move and the temperature information.

In specific implementation, to obtain the lens target movement position, current lens position information may be obtained according to the position information of the motor that controls the lens of the camera to move; then, a lens displacement compensation value is obtained according to the position information of the motor that controls the lens of the camera to move and the temperature information; and then, lens target position information is obtained according to the current lens position information and the lens displacement compensation value.

In specific implementation, the obtaining current lens position information according to the position information of the motor that controls the lens of the camera to move includes: obtaining current focusing lens position information according to position information of a motor that controls a focusing lens to move; and/or obtaining current zoom lens position information according to position information of a motor that controls a zoom lens to move.

In a possible implementation manner, the obtaining a lens displacement compensation value according to the position information of the motor that controls the lens of the camera to move and the temperature information may include: obtaining the current lens position information according to the position information of the motor that controls the lens to move; and obtaining the lens displacement compensation value according to the temperature information and the current lens position information. The obtaining the lens displacement compensation value according to the temperature information and the current lens position information may specifically include: obtaining the lens displacement compensation value according to the temperature information, the current lens position information, and a prestored correspondence among temperature information, lens position information, and a lens displacement compensation value. A person skilled in the art may understand that, in another possible implementation manner, after the current lens position information is obtained according to the position information of the motor that controls the lens to move, the lens target movement position may also be obtained directly according to the temperature information and the current lens position information.

In specific implementation, the lens may be the focusing lens and/or the zoom lens. In specific implementation, when the lens for which temperature compensation needs to be performed is the focusing lens, the obtaining a lens target movement position according to position information of a motor that controls a lens of the camera to move and the temperature information may include: obtaining current focusing lens position information according to the position information of the motor that controls the focusing lens to move; obtaining a focusing lens displacement compensation value according to the temperature information, the current focusing lens position information, and a prestored correspondence among temperature information, focusing lens position information, and a focusing lens displacement compensation value; and obtaining a focusing lens target movement position according to the current focusing lens position information and the lens displacement compensation value.

When the lens for which temperature compensation needs to be performed is the zoom lens, the obtaining a lens target movement position according to position information of a motor that controls a lens of the camera to move and the temperature information may include: obtaining current zoom lens position information according to the position information of the motor that controls the zoom lens to move; obtaining a zoom lens displacement compensation value according to the temperature information, the current zoom lens position information, and a prestored correspondence among temperature information, zoom lens position information, and a zoom lens displacement compensation value; and obtaining a zoom lens target movement position according to the current zoom lens position information and the lens displacement compensation value.

In another possible implementation manner, the obtaining a lens displacement compensation value according to the position information of the motor that controls the lens of the camera to move and the temperature information may include: obtaining current zoom multiple information according to position information of a motor that controls a zoom lens to move; and obtaining a zoom lens displacement compensation value according to the temperature information and the current zoom multiple information, and/or obtaining current object distance information according to position information of a motor that controls a focusing lens to move and the current zoom multiple information, and obtaining a focusing lens displacement compensation value according to the temperature information, the current zoom multiple information, and the current object distance information.

In this implementation manner, a distance between the zoom lens and an imaging plane is mapped using a zoom multiple, and a distance between the focusing lens and the imaging plane is mapped using an object distance. In specific implementation, to simplify operations, temperature compensation may be performed only for the focusing lens, or temperature compensation may be performed only for the zoom lens. Certainly, to improve imaging quality, impact of both the focusing lens and the zoom lens on an optical path may also be considered, and temperature compensation is performed for both the focusing lens and the zoom lens.

S403: Control, according to the obtained lens target movement position, a corresponding lens to move to a target movement position.

When the lens target movement position includes the obtained zoom lens target movement position and/or the obtained focusing lens target movement position, the controlling, according to the obtained lens target movement position, a corresponding lens to move to a target movement position includes: controlling, according to the obtained focusing lens target movement position, the focusing lens to move to a corresponding target movement position; and/or controlling, according to the obtained zoom lens target movement position, the zoom lens to move to a corresponding target movement position. In specific implementation, a corresponding lens is controlled using a motor driver to move to a corresponding target movement position.

In the method provided in this embodiment of the present disclosure, a lens target movement position is obtained according to position information of a motor that controls a lens of a camera to move and temperature information, and a corresponding lens is controlled to move to a corresponding position for compensation; therefore, an imaging quality change, which is caused by a temperature change, of the camera can be effectively compensated for. In the technical solution, the lens target movement position is obtained using the position information of the motor and the temperature information that is relatively easy to obtain instead of depending on position information, which is relatively hard to obtain, of the lens relative to an image sensor; therefore, the method is easy to implement, and has high practicability.

Embodiment 5

Figure 5:
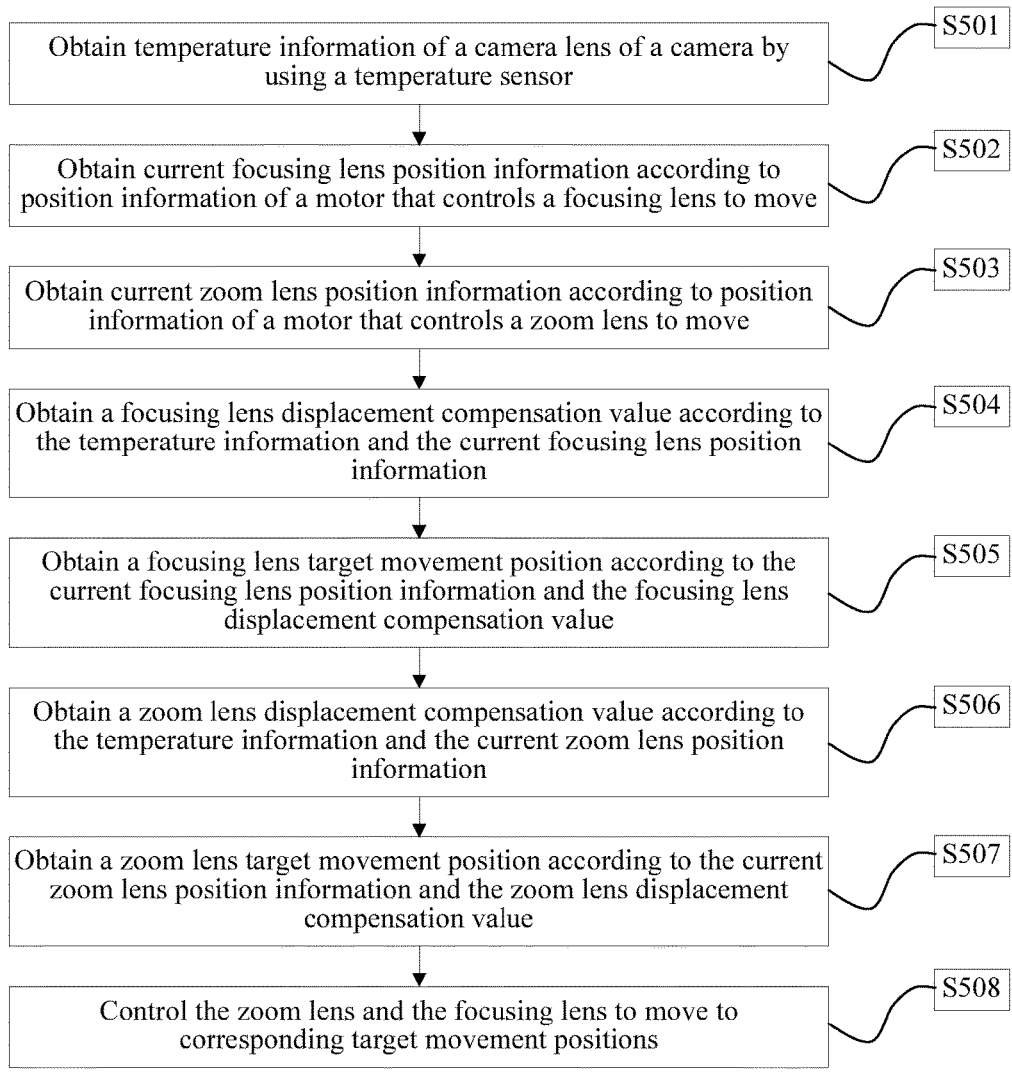
FIG. 5 is a schematic diagram of a second embodiment of a method for performing temperature compensation for a camera according to the embodiments of the present disclosure.

Refer to FIG. 5, which is a schematic diagram of a second embodiment of a method for performing temperature compensation for a camera according to the embodiments of the present disclosure. In this embodiment, current lens position information is mapped using position information, which is relatively easy to obtain, of a motor, a lens displacement compensation value is obtained using a correspondence among temperature information, lens position information, and a lens displacement compensation value, and then, lens target position information is obtained according to the current lens position information and the lens displacement compensation value; therefore, operations are simplified, and practicability is high.

S501: Obtain temperature information of a camera lens of the camera using a temperature sensor.

S502: Obtain current focusing lens position information according to position information of a motor that controls a focusing lens to move.

Generally, there is a correspondence between a position of the lens and a position of a motor that controls the lens to move. Therefore, the position of the lens may be mapped using the position, which is relatively easy to obtain, of the motor. In specific implementation, the correspondence between a position of a motor and a position of a lens may also be prestored, and a current position of the lens is obtained according to the correspondence. In specific implementation, a manner of acquiring position information of the motor may be very flexible. Generally, during control of the motor, an actual physical position of the motor is mapped using one piece of coordinate information; therefore, the position information of the motor may be obtained. For example, a current position of the motor is mapped using a quantity of cycles by which the motor rotates. In a possible implementation manner, during open loop control of the motor, the current position of the motor may be recorded in real time using a software driver, and the position information of the motor can be found according to information recorded by software. In another possible implementation manner, during closed-loop control of the motor, a feedback device (for example, a Hall sensor) is used for controlling of the motor, and a corresponding position of the motor can be obtained by querying for corresponding feedback information (for example, a Hall voltage). After the position of the motor is obtained, the current position of the lens may be obtained according to the prestored correspondence between a position of a motor and a position of a lens. A current position of the focusing lens may be obtained according to the position information of the motor that controls the focusing lens to move.

S503: Obtain current zoom lens position information according to position information of a motor that controls a zoom lens to move.

Correspondingly, a current position of the zoom lens may be obtained according to the position information of the motor that controls the zoom lens to move. Specific implementation is similar to the method in step S502.

S504: Obtain a focusing lens displacement compensation value according to the temperature information and the current focusing lens position information.

The obtaining a focusing lens displacement compensation value according to the temperature information and the current focusing lens position information includes: obtaining the focusing lens displacement compensation value according to the temperature information, the current focusing lens position information, and a prestored correspondence among temperature information, focusing lens position information, and a focusing lens displacement compensation value. In specific implementation, the correspondence among temperature information, lens position information, and a lens displacement compensation value may be stored using a database. As shown in Table 1, focusPos1 to focusPosn are position information of a focusing lens, and a default part in the table is corresponding displacement compensation values. The displacement compensation values are obtained by means of experiment or by means of simulation or are provided by a camera lens vendor. A method for acquiring a compensation value may be: directly obtaining the compensation value according to a focusing lens and by means of temperature table lookup or by means of interpolation. For example, when a position or a temperature of a corresponding focusing lens is not stored in the table or a numerical value corresponding to a focusing lens is not found, a corresponding displacement compensation value may be acquired using an interpolation method. The interpolation method may be a two-dimensional linear interpolation method.

TABLE 1

| | ... | 0° C. | 10° C. | 20° C. | 30° C. | ... |
|---|---|---|---|---|---|---|
| focusPos1 | | | | | | |
| focusPos2 | | | | | | |
| focusPos3 | | | | | | |
| ... | | | | | | |
| focusPosn | | | | | | |

S505: Obtain a focusing lens target movement position according to the current focusing lens position information and the focusing lens displacement compensation value.

The focusing lens target movement position may be obtained by adding the current focusing lens position information and the focusing lens displacement compensation value. It should be noted that the focusing lens displacement compensation value obtained in step S504 may be a positive value or may be a negative value, and is used to indicate a movement direction of the lens. Specifically, a specific movement direction of the lens that makes the focusing lens displacement compensation value be a positive value and a specific movement direction of the lens that makes the focusing lens displacement compensation value be a negative value may be preset as required. Certainly, a displacement direction of the lens may also be indicated in another manner, which is not limited herein.

S506: Obtain a zoom lens displacement compensation value according to the temperature information and the current zoom lens position information.

The obtaining a zoom lens displacement compensation value according to the temperature information and the current zoom lens position information includes: obtaining the zoom lens displacement compensation value according to the temperature information, the current zoom lens position information, and a prestored correspondence among temperature information, zoom lens position information, and a zoom lens displacement compensation value. In specific implementation, the correspondence among temperature information, zoom lens position information, and a zoom lens displacement compensation value may be stored using a database. As shown in Table 2, zoomPos1 to zoomPosn are position information of a zoom lens, and a default part in the Table is corresponding displacement compensation values. The displacement compensation values are obtained by means of experiment or by means of simulation or are provided by a camera lens vendor. A method for acquiring a compensation value may be: directly obtaining the compensation value according to zoom lens position information and by means of temperature table lookup or by means of interpolation. For example, when a position or a temperature of a corresponding zoom lens is not stored in the table or a numerical value corresponding to a focusing lens is not found, a corresponding displacement compensation value may be acquired using an interpolation method. The interpolation method may be a two-dimensional linear interpolation method.

TABLE 2

| | ... | 0° C. | 10° C. | 20° C. | 30° C. | ... |
|---|---|---|---|---|---|---|
| zoomPos1 | | | | | | |
| zoomPos2 | | | | | | |
| zoomPos3 | | | | | | |
| ... | | | | | | |
| zoomPosn | | | | | | |

S507: Obtain a zoom lens target movement position according to the current zoom lens position information and the zoom lens displacement compensation value.

The zoom lens target movement position may be obtained by adding the current zoom lens position information and the zoom lens displacement compensation value. It should be noted that the zoom lens displacement compensation value obtained in step S506 may be a positive value or may be a negative value, and is used to indicate a movement direction of the lens. Specifically, a specific movement direction of the lens that makes the zoom lens displacement compensation value be a positive value and a specific movement direction of the lens that makes the zoom lens displacement compensation value be a negative value may be preset as required. Certainly, a displacement direction of the lens may also be indicated in another manner, which is not limited herein.

S508: Control the zoom lens and the focusing lens to move to corresponding target movement positions.

In specific implementation, a processor controls, using a motor driver, the zoom lens to move to the zoom lens target movement position; the processor controls, using a motor driver, the focusing lens to move to the focusing lens target movement position. The motor drivers may be a same motor driver, or may be different motor drivers.

It should be noted that a sequence for executing step S502 to step S508 is not fixed. A person skilled in the art may adjust the execution sequence of the foregoing steps as required, or may concurrently perform some steps, which is not limited herein.

In this embodiment, when current positions of a focusing lens and a zoom lens are acquired, a distance between a corresponding lens and an imaging plane is mapped using position information of a motor that controls a corresponding lens to move, and there is no need to depend on an absolute distance between the lens and the imaging plane. Because the position information of the motor is relatively easy to obtain, practicability and simplicity and convenience of the method are improved. In addition, in the method provided in this embodiment, a lens displacement compensation value is obtained using a correspondence among a temperature, a lens position, and a displacement compensation value, and a lens target movement position is further obtained. Therefore, the method is easy to implement, and can also achieve relatively high accuracy. In addition, in this embodiment, not only impact of the focusing lens on imaging quality is considered, but also impact of the zoom lens on the imaging quality is considered, so as to ensure that a relatively high image definition is maintained when a temperature changes.

It should be noted that a person skilled in the art may understand that in a case in which human eyes are insensitive to a zoom multiple, to simplify operations, displacement compensation may be performed only for the focusing lens; therefore, the image definition can be also improved. Certainly, compensation may also be performed only for the zoom lens, so as to compensate for impact on the zoom multiple and the definition. However, in this manner, to ensure the image definition, the zoom lens may need to be moved substantially, affecting operation experience of an operator.

Embodiment 6

In the sixth embodiment of the present disclosure, a difference from the fifth embodiment is that: a zoom lens target movement position is obtained according to a correspondence among a temperature, a zoom multiple, and a displacement compensation value; and a focusing lens target movement position is obtained according to a correspondence among a temperature, a zoom multiple, an object distance, and a displacement compensation value.

Figure 6:
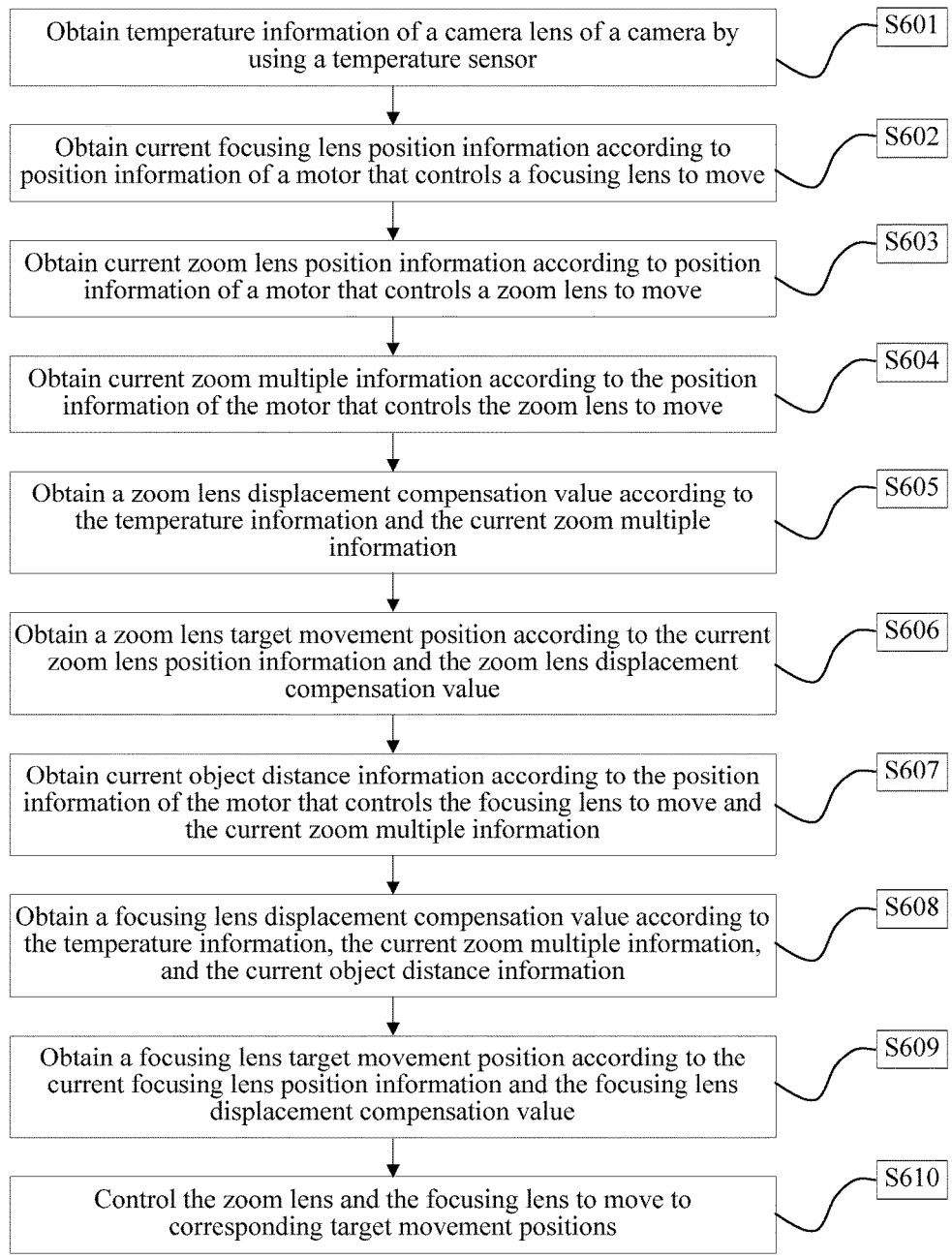
FIG. 6 is a schematic diagram of a third embodiment of a method for performing temperature compensation for a camera according to the embodiments of the present disclosure.

Refer to FIG. 6, which is a schematic diagram of a third embodiment of a method for performing temperature compensation for a camera according to the embodiments of the present disclosure.

S601: Obtain temperature information of a camera lens of the camera using a temperature sensor.

S602: Obtain current focusing lens position information according to position information of a motor that controls a focusing lens to move.

Generally, there is a correspondence between a position of the lens and a position of a motor that controls the lens to move. Therefore, the position of the lens may be mapped using the position, which is relatively easy to obtain, of the motor. In specific implementation, the correspondence between a position of a motor and a position of a lens may also be prestored, and a current position of the lens is obtained according to the correspondence. In specific implementation, a manner of acquiring position information of the motor may be very flexible. Generally, during control of the motor, an actual physical position of the motor is mapped using one piece of coordinate information; therefore, the position information of the motor may be obtained. For example, a current position of the motor is mapped using a quantity of cycles by which the motor rotates. In a possible implementation manner, during open loop control of the motor, the current position of the motor may be recorded in real time using a software driver, and the position information of the motor can be found according to information recorded by software. In another possible implementation manner, during closed-loop control of the motor, a feedback device (for example, a Hall sensor) is used for controlling of the motor, and a corresponding position of the motor can be obtained by querying for corresponding feedback information (for example, a Hall voltage). After the position of the motor is obtained, the current position of the lens may be obtained according to the prestored correspondence between a position of a motor and a position of a lens. A current position of the focusing lens may be obtained according to the position information of the motor that controls the focusing lens.

S603: Obtain current zoom lens position information according to position information of a motor that controls a zoom lens to move.

Correspondingly, a current position of the zoom lens may be obtained according to the position information of the motor that controls the zoom lens. Specific implementation is similar to the method in step S602.

S604: Obtain current zoom multiple information according to the position information of the motor that controls the zoom lens to move.

Figure 7:
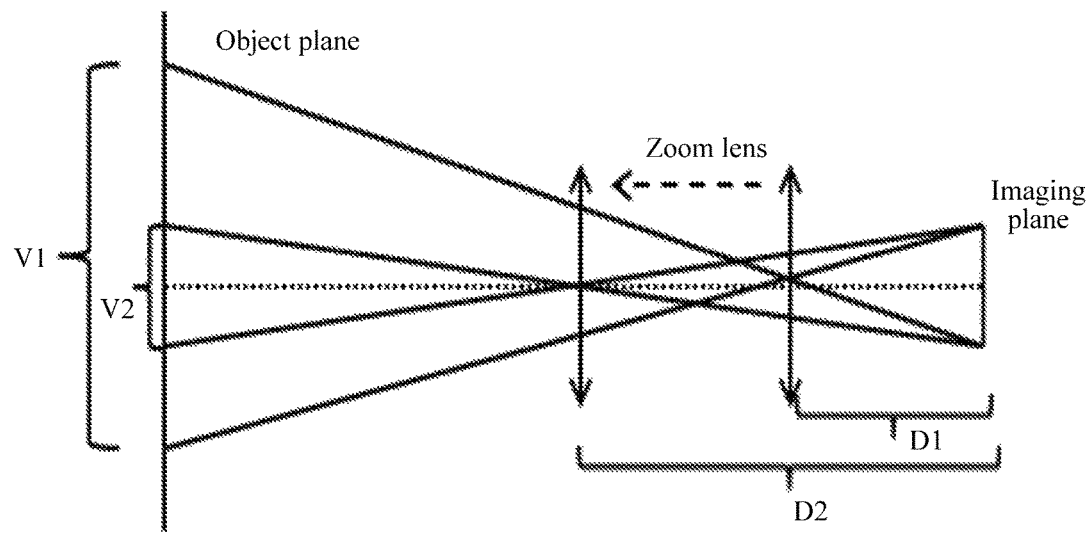
FIG. 7 is a schematic diagram of a mapping relationship between a zoom multiple and a distance between a zoom lens and an imaging plane.

In this embodiment of the present disclosure, position information, which is relatively hard to acquire, of the zoom lens relative to an image sensor is converted into zoom multiple information. As shown in FIG. 7, different distances between the zoom lens and the imaging plane indicate different magnification multiples (that is, zoom multiples) of a shot object, and a one-to-one correspondence exists between the distance and the magnification multiple; therefore, a distance between the zoom lens and the imaging plane may be mapped using a zoom multiple that can be easily obtained. D1 and D2 in FIG. 7 are distances between the zoom lens and the imaging plane; V1 and V2 are sizes of shooting fields of view, and are mapped to zoom multiples. Different distances correspond to different imaging multiples, that is, D1 corresponds to V1, and D2 corresponds to V2. There is a correspondence between the position information of the motor that controls the focusing lens to move and the distance between the zoom lens and the imaging plane (that is, position information of a zoom lens); therefore, the zoom multiple information may be obtained using the position information of the motor that controls the zoom lens to move, and the distance between the zoom lens and the imaging plane is mapped using a zoom multiple. In specific implementation, a correspondence between position information of a motor that controls a focusing lens to move and zoom multiple information may be pre-established, and corresponding current zoom multiple information may be obtained using the current position information of the motor.

S605: Obtain a zoom lens displacement compensation value according to the temperature information and the current zoom multiple information.

The obtaining a zoom lens displacement compensation value according to the temperature information and the current zoom multiple information includes: obtaining the zoom lens displacement compensation value according to the temperature information, the current zoom multiple information, and a prestored correspondence among temperature information, zoom multiple information, and a zoom lens displacement compensation value. In specific implementation, the correspondence among temperature information, zoom multiple information, and a zoom displacement compensation value may be stored using a database. As shown in Table 3, zoom1 to zoomn are information related to a zoom multiple, and a default part in the table is corresponding displacement compensation values. The displacement compensation values are obtained by means of experiment or by means of simulation or are provided by a camera lens vendor. The table may be directly queried for a compensation value according to a current zoom multiple and temperature information, and if a corresponding zoom multiple or temperature is not in the table, a corresponding compensation value is acquired using an interpolation method, for example, a two-dimensional linear interpolation method.

TABLE 3

| . . . | 0° C. | 10° C. | 20° C. | 30° C. | . . . |
|---|---|---|---|---|---|
| zoom1 | | | | | |
| zoom2 | | | | | |
| zoom3 | | | | | |
| . . . | | | | | |
| zoomn | | | | | |

S606: Obtain a zoom lens target movement position according to the current zoom lens position information and the zoom lens displacement compensation value.

The zoom lens target movement position may be obtained by adding the current zoom lens position information and the zoom lens displacement compensation value. It should be noted that the zoom lens displacement compensation value obtained in step S605 may be a positive value or may be a negative value, and is used to indicate a movement direction of the lens. Specifically, a specific movement direction of the lens that makes the zoom lens displacement compensation value be a positive value and a specific movement direction of the lens that makes the zoom lens displacement compensation value be a negative value may be preset as required. Certainly, a displacement direction of the lens may also be indicated in another manner, which is not limited herein.

S607: Obtain current object distance information according to the position information of the motor that controls the focusing lens to move and the current zoom multiple information.

Figure 8:
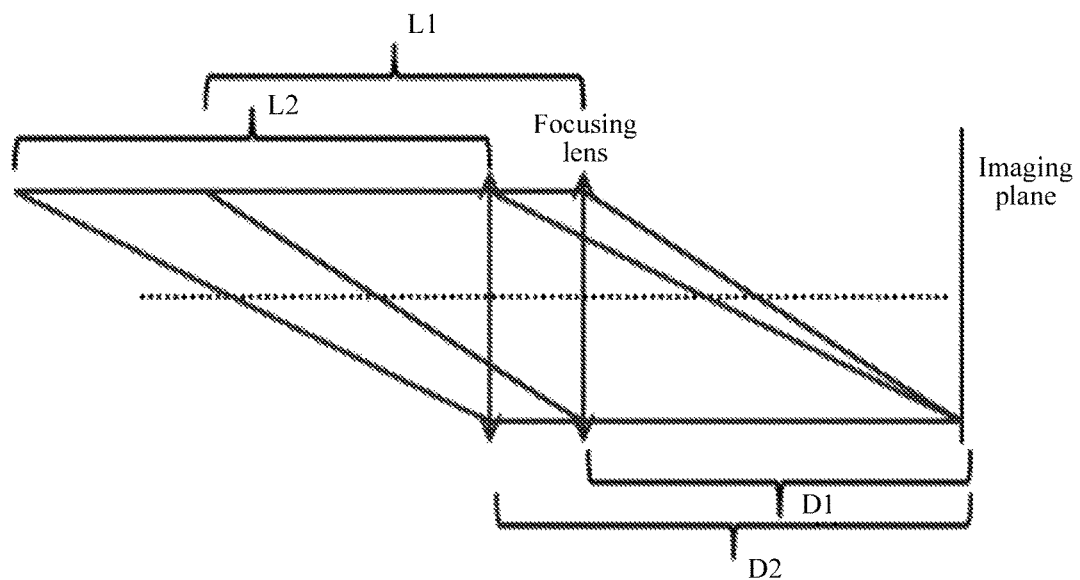
FIG. 8 is a schematic diagram of a mapping relationship between an object distance and a distance between a focusing lens and an imaging plane at a zoom multiple.

In this embodiment of the present disclosure, position information, which is relatively hard to acquire, of the focusing lens relative to the image sensor is converted into object distance information. As shown in FIG. 8, different distances between the focusing lenses and the imaging plane indicate different optimal imaging distances (object distances) of shot objects, and a one-to-one correspondence exists between the distance and the optimal imaging distance; and a distance between the focusing lens and the imaging plane may be mapped using an object distance that can be easily obtained. D1 and D2 in FIG. 8 are distances between the focusing lens and the imaging plane, and L1 and L2 are object distances. Different distances correspond to different object distances, that is, D1 corresponds to L1, and D2 corresponds to L2. In specific implementation, a correspondence among position information of a motor that controls a focusing lens to move, zoom multiple information, and object distance information is established, and if two pieces of information thereof are known, a third piece of information can be obtained. Corresponding to the present disclosure, the current object distance information is obtained according to the position information of the motor that controls the focusing lens to move and the current zoom multiple information.

S608: Obtain a focusing lens displacement compensation value according to the temperature information, the current zoom multiple information, and the current object distance information.

Figure 10:
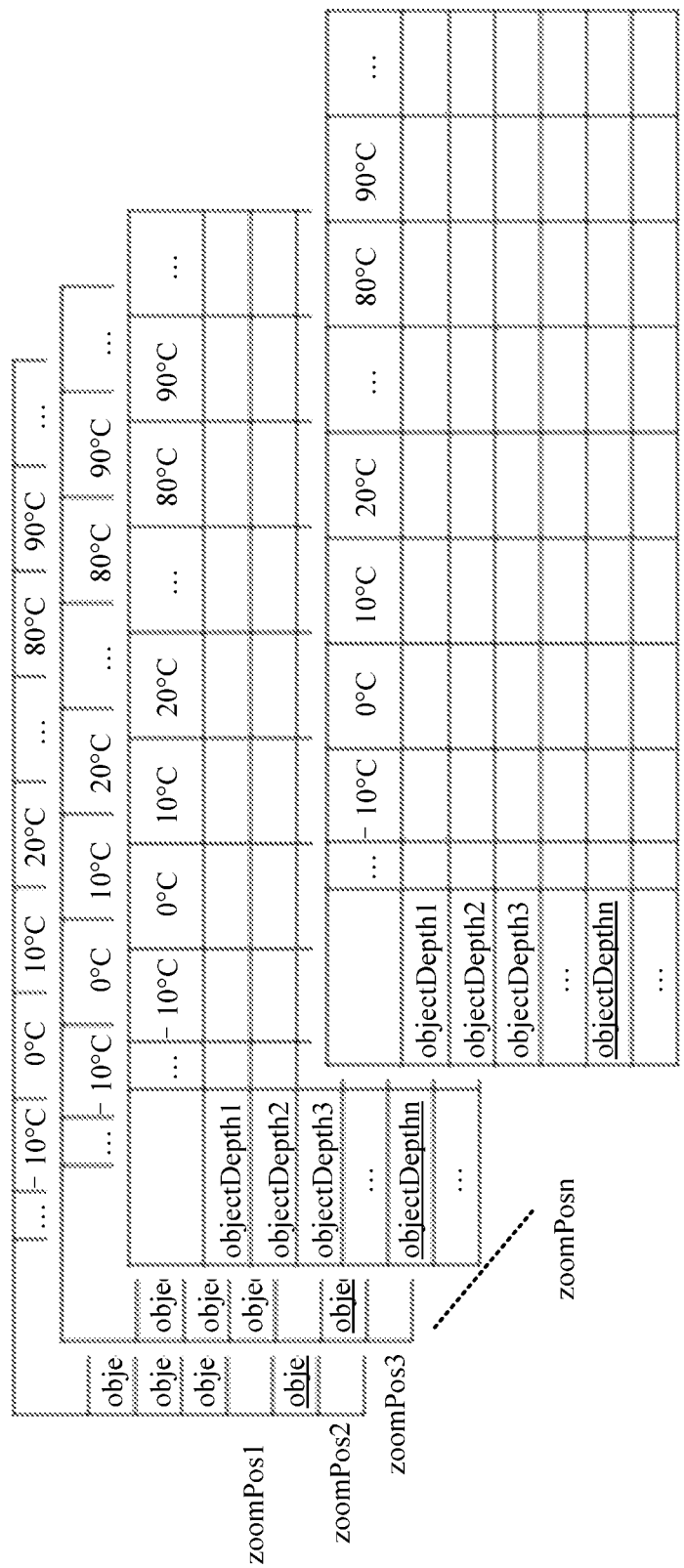
FIG. 10 is a schematic diagram of tables of correspondences among temperature information, zoom multiple information, object distance information, and a focusing lens displacement compensation value according to an embodiment of the present disclosure.

The obtaining a focusing lens displacement compensation value according to the temperature information, the current zoom multiple information, and the current object distance information includes: obtaining the focusing lens displacement compensation value according to the temperature information, the current zoom multiple information, the current object distance information, and a prestored correspondence among temperature information, zoom multiple information, object distance information, and a focusing lens displacement compensation value. In specific implementation, a correspondence among temperature information, zoom lens position information, and a zoom lens displacement compensation value may be stored using a database. As shown in FIG. 10, zoom1 to zoomn are information related to a zoom multiple, objectDepth1 to objectDepthn are object distance information, and a default part in the table is corresponding compensation values; the table may be directly queried for a compensation value according to a current zoom multiple, an object distance, and temperature information; and if a corresponding zoom multiple, temperature, or object distance is not in the table, a corresponding compensation value is acquired using an interpolation method.

S609: Obtain a focusing lens target movement position according to the current focusing lens position information and the focusing lens displacement compensation value.

The focusing lens target movement position may be obtained by adding the current focusing lens position information and the focusing lens displacement compensation value. It should be noted that the focusing lens displacement compensation value obtained in step S608 may be a positive value or may be a negative value, and is used to indicate a movement direction of the lens. Specifically, a specific movement direction of the lens that makes the focusing lens displacement compensation value be a positive value and a specific movement direction of the lens that makes the focusing lens displacement compensation value be a negative value may be preset as required. Certainly, a displacement direction of the lens may also be indicated in another manner, which is not limited herein.

S610: Control the zoom lens and the focusing lens to move to corresponding target movement positions.

In specific implementation, a processor controls, using a motor driver, the zoom lens to move to the zoom lens target movement position; the processor controls, using a motor driver, the focusing lens to move to the focusing lens target movement position. The motor drivers may be a same motor driver, or may be different motor drivers.

It should be noted that a sequence for executing step S602 to step S610 is not fixed. A person skilled in the art may adjust the execution sequence of the foregoing steps as required, or may concurrently perform some steps, which is not limited herein.

In this embodiment, when current positions of a focusing lens and a zoom lens are acquired, a distance between a zoom lens and an imaging plane is mapped using a zoom multiple, a distance between a focusing lens and the imaging plane is mapped using an object distance, and there is no need to depend on an absolute distance between the lens and the imaging plane. Because position information of a motor, zoom multiple information, and object distance information is relatively easy to obtain, practicability and simplicity and convenience of the method are improved. In addition, in this embodiment, not only impact of a focusing lens on imaging quality is considered, but also impact of a zoom lens on imaging quality is considered, so as to ensure that a relatively high image definition is maintained when a temperature changes.

Embodiment 7

Figure 9:
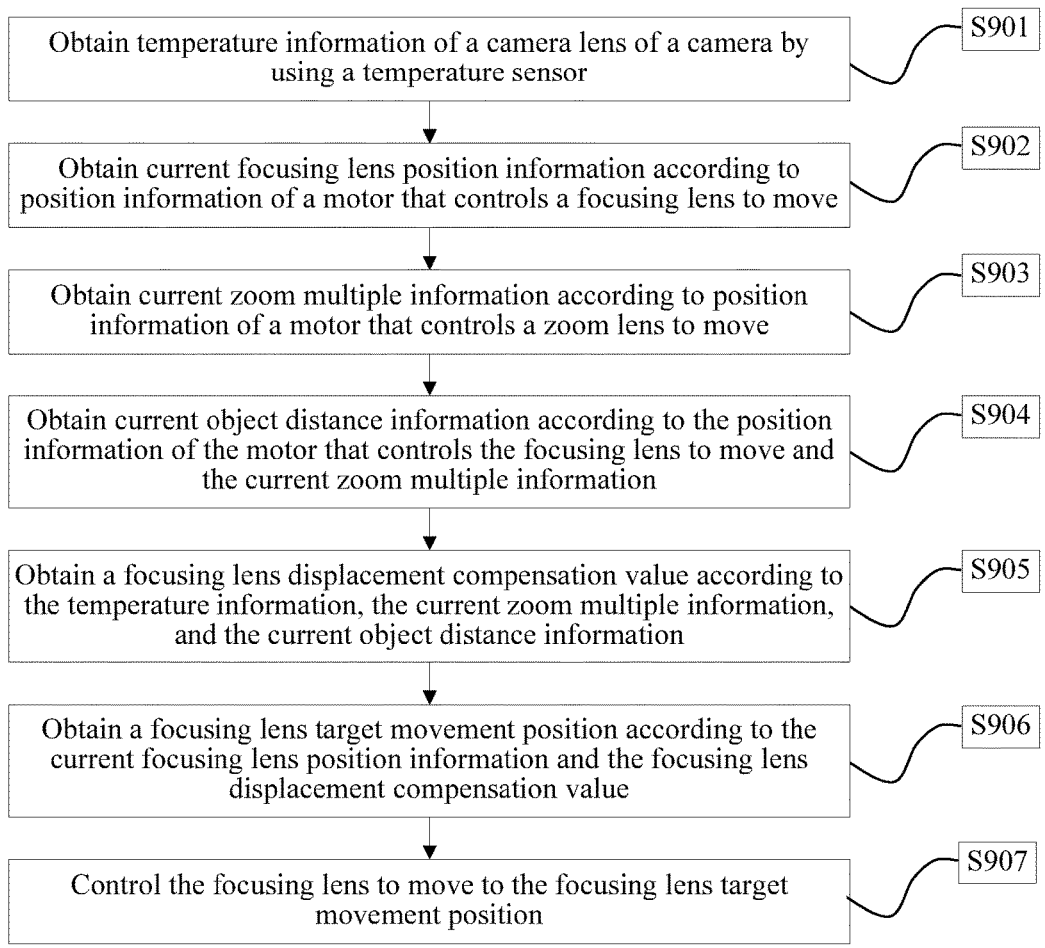
FIG. 9 is a schematic diagram of a fourth embodiment of a method for performing temperature compensation for a camera according to the embodiments of the present disclosure.

Refer to FIG. 9, which is a schematic diagram of a fourth embodiment of a method for performing temperature compensation for a camera according to the embodiments of the present disclosure.

A difference between this embodiment and the previous embodiment is that, in a case in which a requirement on a zoom multiple due to a slight change of a temperature is not high in some application scenarios, to simplify operations, displacement compensation may also be performed only for a focusing lens, which can also improve an image definition.

S901: Obtain temperature information of a camera lens of the camera using a temperature sensor.

S902: Obtain current focusing lens position information according to position information of a motor that controls a focusing lens to move.

Generally, there is a correspondence between a position of the lens and a position of a motor that controls the lens to move. Therefore, the position of the lens may be mapped using the position, which is relatively easy to obtain, of the motor. In specific implementation, the correspondence between a position of a motor and a position of a lens may also be prestored, and a current position of the lens is obtained according to the correspondence. In specific implementation, a manner of acquiring position information of the motor may be very flexible. Generally, during control of the motor, an actual physical position of the motor is mapped using one piece of coordinate information; therefore, the position information of the motor may be obtained. For example, a current position of the motor is mapped using a quantity of cycles by which the motor rotates. In a possible implementation manner, during open loop control of the motor, the current position of the motor may be recorded in real time using a software driver, and the position information of the motor can be found according to information recorded by software. In another possible implementation manner, during closed-loop control of the motor, a feedback device (for example, a Hall sensor) is used for controlling of the motor, and a corresponding position of the motor can be obtained by querying for corresponding feedback information (for example, a Hall voltage). After the position of the motor is obtained, the current position of the lens may be obtained according to the prestored correspondence between a position of a motor and a position of a lens. A current position of the focusing lens may be obtained according to the position information of the motor that controls the focusing lens.

S903: Obtain current zoom multiple information according to position information of a motor that controls a zoom lens to move.

In this embodiment of the present disclosure, position information, which is relatively hard to acquire, of the zoom lens relative to an image sensor is converted into zoom multiple information. As shown in FIG. 7, different distances between the zoom lens and the imaging plane indicate different magnification multiples (that is, zoom multiples) of a shot object, and a one-to-one correspondence exists between the distance and the magnification multiple; therefore, a distance between the zoom lens and the imaging plane may be mapped using a zoom multiple that can be easily obtained. D1 and D2 in FIG. 7 are distances between the zoom lens and the imaging plane; V1 and V2 are sizes of shooting fields of view, and are mapped to zoom multiples. Different distances correspond to different imaging multiples, that is, D1 corresponds to V1, and D2 corresponds to V2. There is a correspondence between the position information of the motor that controls the focusing lens to move and the distance between the zoom lens and the imaging plane (that is, position information of a zoom lens); therefore, the zoom multiple information may be obtained using the position information of the motor that controls the zoom lens to move, and the distance between the zoom lens and the imaging plane is mapped using a zoom multiple. In specific implementation, a correspondence between position information of a motor that controls a focusing lens to move and zoom multiple information may be pre-established, and corresponding current zoom multiple information may be obtained using the current position information of the motor.

S904: Obtain current object distance information according to the position information of the motor that controls the focusing lens to move and the current zoom multiple information.

In this embodiment of the present disclosure, position information, which is relatively hard to acquire, of the focusing lens relative to the image sensor is converted into object distance information. As shown in FIG. 8, different distances between the focusing lenses and the imaging plane indicate different optimal imaging distances (object distances) of shot objects, and a one-to-one correspondence exists between the distance and the optimal imaging distance; and a distance between the focusing lens and the imaging plane may be mapped using an object distance that can be easily obtained. D1 and D2 in FIG. 8 are distances between the focusing lens and the imaging plane, and L1 and L2 are object distances. Different distances correspond to different object distances, that is, D1 corresponds to L1, and D2 corresponds to L2. In specific implementation, a correspondence among position information of a motor that controls a focusing lens, zoom multiple information, and object distance information is established, and if two pieces of information thereof are known, a third piece of information can be obtained. Corresponding to the present disclosure, the current object distance information is obtained according to the position information of the motor that controls the focusing lens to move and the current zoom multiple information.

S905: Obtain a focusing lens displacement compensation value according to the temperature information, the current zoom multiple information, and the current object distance information.

The obtaining a focusing lens displacement compensation value according to the temperature information, the current zoom multiple information, and the current object distance information includes: obtaining the focusing lens displacement compensation value according to the temperature information, the current zoom multiple information, the current object distance information, and a prestored correspondence among temperature information, zoom multiple information, object distance information, and a focusing lens displacement compensation value. As shown in Table 4, zoom1 to zoomn are information related to a zoom multiple, objectDepth1 to objectDepthn are object distance information, and a default part in the table is corresponding compensation values; the table may be directly queried for a compensation value according to a current zoom multiple, an object distance, and temperature information; and if a corresponding zoom multiple, temperature, or object distance is not in the table, a corresponding compensation value is acquired using an interpolation method.

It should be noted that, a difference from the previous embodiment is that, a compensation value of the focusing lens herein not only includes a change, which is caused by a temperature, in a definition of the focusing lens, but also includes a change, which is caused by a temperature change, in an image definition of the zoom lens. This is because after the zoom lens is affected by a temperature, not only a zoom multiple changes, but also a focusing status changes. However, the zoom multiple is slightly affected; therefore, in a case in which human eyes are not very sensitive to the zoom multiple, it is controlled that temperature compensation is directly performed only for the focusing lens. Impact of the zoom lens on a definition may also be compensated for using the focusing lens.

S906: Obtain a focusing lens target movement position according to the current focusing lens position information and the focusing lens displacement compensation value.

The focusing lens target movement position may be obtained by adding the current focusing lens position information and the focusing lens displacement compensation value. It should be noted that the focusing lens displacement compensation value obtained in step S905 may be a positive value or may be a negative value, and is used to indicate a movement direction of the lens. Specifically, a specific movement direction of the lens that makes the focusing lens displacement compensation value be a positive value and a specific movement direction of the lens that makes the focusing lens displacement compensation value be a negative value may be preset as required. Certainly, a displacement direction of the lens may also be indicated in another manner, which is not limited herein.

S907: Control the focusing lens to move to the focusing lens target movement position.

In specific implementation, a processor controls, using a motor driver, the focusing lens to move to the focusing lens target movement position.

In this embodiment, when a current position of a focusing lens is acquired, a distance between a focusing lens and an imaging plane is mapped using an object distance, and there is no need to depend on an absolute distance between a lens and the imaging plane. Because position information of a motor, zoom multiple information, and object distance information is relatively easy to obtain, practicability and simplicity and convenience of the method are improved. In addition, in this embodiment, in a case in which human eyes are insensitive to a zoom multiple, operations are simplified, and a definition change caused by displacement of the focusing lens and the zoom lens is compensated for using only movement of the focusing lens, which can also achieve a relatively good effect.

It should be noted that, a person skilled in the art may understand that, certainly, compensation may also be performed only for the zoom lens, so as to compensate for impact on the zoom multiple and a definition. However, in this manner, to ensure the image definition, the zoom lens may need to be moved substantially, affecting operation experience of an operator.

It should be noted that, because the method embodiments are described in detail, and the apparatus embodiments are described relatively briefly, it can be understood by a person skilled in the art that, the apparatus embodiments can be constructed with reference to the method embodiments. Other implementation manners acquired by a person skilled in the art without creative efforts fall within the protection scope of the present disclosure.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element. The present disclosure can be described in the general context of executable computer instructions executed by a computer, for example, a program module. Generally, the program unit includes a routine, program, object, component, data structure, and the like for executing a particular task or implementing a particular abstract data type. The present disclosure may also be practiced in distributed computing environments in which tasks are performed by remote processing devices that are connected through a communications network. In a distributed computing environment, program modules may be located in both local and remote computer storage media including storage devices.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts. The foregoing descriptions are merely specific implementation manners of the present disclosure. It should be noted that a person of ordinary skill in the art may make several improvements or polishing without departing from the principle of the present disclosure and the improvements or polishing shall fall within the protection scope of the present disclosure.

What is claimed is:

1. A method for performing temperature compensation for a camera, wherein the method comprises:
   obtaining temperature information of a camera lens of the camera using a temperature sensor;
   obtaining a lens target movement position according to position information of a motor that controls a lens of the camera to move and the temperature information; and
   controlling, according to the obtained lens target movement position, a corresponding lens to move to a target movement position.

2. The method according to claim 1, wherein obtaining the lens target movement position according to the position information of the motor that controls the lens of the camera to move and the temperature information comprises:
   obtaining current lens position information according to the position information of the motor that controls the lens of the camera to move;
   obtaining a lens displacement compensation value according to the position information of the motor that controls the lens of the camera to move and the temperature information; and
   obtaining the lens target movement position according to the current lens position information and the lens displacement compensation value.

3. The method according to claim 2, wherein obtaining the lens displacement compensation value according to the position information of the motor that controls the lens of the camera to move and the temperature information comprises obtaining the lens displacement compensation value according to the temperature information and the current lens position information that is obtained according to the position information of the motor that controls the lens to move.

4. The method according to claim 3, wherein obtaining the lens displacement compensation value according to the temperature information and the current lens position information that is obtained according to the position information of the motor that controls the lens to move comprises obtaining the lens displacement compensation value according to the temperature information, the current lens position information, and a prestored correspondence among temperature information, lens position information, and a lens displacement compensation value.

5. The method according to claim 2, wherein obtaining the lens displacement compensation value according to the position information of the motor that controls the lens of the camera to move and the temperature information comprises:
   obtaining current zoom multiple information according to position information of a motor that controls a zoom lens to move;
   obtaining a zoom lens displacement compensation value according to the temperature information and the current zoom multiple information;
   obtaining current object distance information according to position information of a motor that controls a focusing lens to move and the current zoom multiple information; and
   obtaining a focusing lens displacement compensation value according to the temperature information, the current zoom multiple information, and the current object distance information.

6. The method according to claim 5, wherein obtaining the zoom lens displacement compensation value according to the temperature information and the current zoom multiple information comprises obtaining the zoom lens displacement compensation value according to the temperature information, the current zoom multiple information, and a prestored correspondence among temperature information, zoom multiple information, and a zoom lens displacement compensation value.

7. The method according to claim 5, wherein obtaining the current object distance information according to the position information of the motor that controls the focusing lens to move and the current zoom multiple information comprises obtaining the current object distance information according to the position information of the motor that controls the focusing lens to move and the current zoom multiple information, and wherein obtaining the focusing lens displacement compensation value according to the temperature information, the current zoom multiple information, and the current object distance information comprises obtaining the focusing lens displacement compensation value according to the temperature information, the current zoom multiple information, the current object distance information, and a prestored correspondence among temperature information, zoom multiple information, object distance information, and a focusing lens displacement compensation value.

8. The method according to claim 2, wherein obtaining the lens displacement compensation value according to the position information of the motor that controls the lens of the camera to move and the temperature information comprises:
   obtaining current zoom multiple information according to position information of a motor that controls a zoom lens to move; and
   obtaining a zoom lens displacement compensation value according to the temperature information and the current zoom multiple information.

9. The method according to claim 8, wherein obtaining the zoom lens displacement compensation value according to the temperature information and the current zoom multiple information comprises obtaining the zoom lens displacement compensation value according to the temperature information, the current zoom multiple information, and a prestored correspondence among temperature information, zoom multiple information, and a zoom lens displacement compensation value.

10. The method according to claim 2, wherein obtaining the lens displacement compensation value according to the position information of the motor that controls the lens of the camera to move and the temperature information comprises:
    obtaining current zoom multiple information according to position information of a motor that controls a zoom lens to move;
    obtaining current object distance information according to position information of a motor that controls a focusing lens to move and the current zoom multiple information; and
    obtaining a focusing lens displacement compensation value according to the temperature information, the current zoom multiple information, and the current object distance information.

11. The method according to claim 10, wherein obtaining the current object distance information according to the position information of the motor that controls the focusing lens to move and the current zoom multiple information comprises obtaining the current object distance information according to the position information of the motor that controls the focusing lens to move and the current zoom multiple information, and wherein obtaining the focusing lens displacement compensation value according to the temperature information, the current zoom multiple information, and the current object distance information comprises obtaining the focusing lens displacement compensation value according to the temperature information, the current zoom multiple information, the current object distance information, and a prestored correspondence among temperature information, zoom multiple information, object distance information, and a focusing lens displacement compensation value.

12. An apparatus for performing temperature compensation for a camera, wherein the apparatus comprises:
   a temperature sensor configured to obtain temperature information of a camera lens of the camera;
   a processor coupled to the temperature sensor and configured to obtain a lens target movement position according to position information of a motor that controls a lens of the camera to move and the temperature information; and
   a controller coupled to the processor and configured to control, according to the obtained lens target movement position, a corresponding lens to move to a target movement position.

13. The apparatus according to claim 12, wherein the processor is further configured to:
   obtain current lens position information according to the position information of the motor that controls the lens to move;
   obtain a lens displacement compensation value according to the position information of the motor that controls the lens of the camera to move and the temperature information; and
   obtain the lens target movement position according to the current lens position information and the lens displacement compensation value.

14. The apparatus according to claim 13, wherein the processor is further configured to obtain the lens displacement compensation value according to the temperature information and the current lens position information that is obtained according to the position information of the motor that controls the lens to move.

15. The apparatus according to claim 13, wherein the processor is further configured to:
   obtain current zoom multiple information according to position information of a motor that controls a zoom lens to move;
   obtain a zoom lens displacement compensation value according to the temperature information and the current zoom multiple information;
   obtain current object distance information according to position information of a motor that controls a focusing lens to move and the current zoom multiple information; and
   obtain a focusing lens displacement compensation value according to the temperature information, the current zoom multiple information, and the current object distance information.

16. A camera comprising:
   a camera motor coupled to a camera lens;
   a focus motor coupled to a focusing lens;
   a zoom motor coupled to a zoom lens;
   a temperature sensor configured to obtain temperature information of the camera lens;
   a processor coupled to the temperature sensor and configured to obtain a lens target movement position according to position information of a motor that controls a lens of the camera to move and temperature information; and
   a motor driver coupled to the processor, the camera motor, the focus motor, and the zoom motor, wherein the motor driver is configured to control, according to the obtained lens target movement position, a corresponding lens to move to a target movement position using a corresponding motor.

17. The camera according to claim 16, wherein the processor is further configured to:
   obtain current lens position information according to the position information of the motor that controls the lens of the camera to move;
   obtain a lens displacement compensation value according to the position information of the motor that controls the lens of the camera to move and the temperature information; and
   obtain the lens target movement position according to the current lens position information and the lens displacement compensation value.

18. The camera according to claim 17, wherein the processor is further configured to obtain the lens displacement compensation value according to the temperature information and the current lens position information that is obtained according to the position information of the motor that controls the lens to move.

19. The camera according to claim 17, wherein the processor is further configured to:
   obtain current zoom multiple information according to position information of a motor that controls a zoom lens to move;
   obtain a zoom lens displacement compensation value according to the temperature information and the current zoom multiple information;
   obtain current object distance information according to position information of a motor that controls a focusing lens to move and the current zoom multiple information; and
   obtain a focusing lens displacement compensation value according to the temperature information, the current zoom multiple information, and the current object distance information.

* * * * *